(Model.)

R. HOFFMAN.
WICK TRIMMER.

No. 303,431. Patented Aug. 12, 1884.

WITNESSES:
Theo. G. Hoster
C. Sedgwick

INVENTOR:
R. Hoffman
BY Munn & Co
ATTORNEYS.

UNITED STATES PATENT OFFICE.

ROBERT HOFFMAN, OF COHOES, NEW YORK.

WICK-TRIMMER.

SPECIFICATION forming part of Letters Patent No. 303,431, dated August 12, 1884.

Application filed December 5, 1883. (Model.)

*To all whom it may concern:*

Be it known that I, ROBERT HOFFMAN, of Cohoes, in the county of Albany and State of New York, have invented a new and Improved Lamp-Wick Trimmer, of which the following is a full, clear, and exact description.

The object of my invention is to provide a new and improved device for trimming lamp-wicks which are to have their upper ends rounded.

The invention consists in a wick-trimmer constructed and arranged as hereinafter described and claimed.

Reference is to be had to the accompanying drawings, forming part of this specification, in which similar letters of reference indicate corresponding parts in all the figures.

Figure 1:
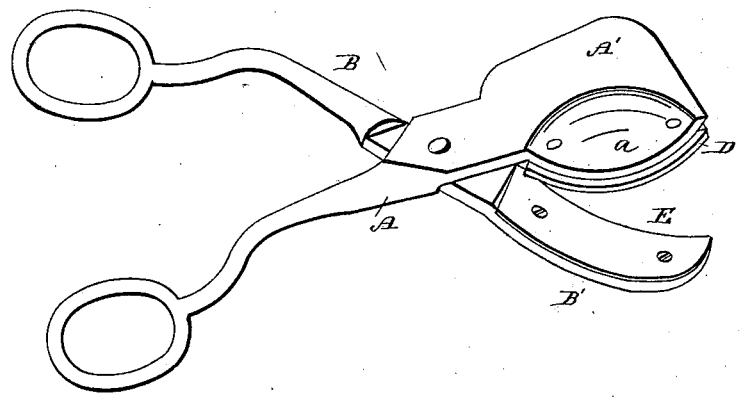
Figure 2:
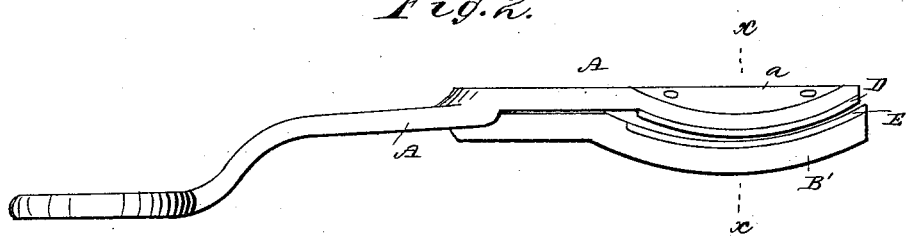
Figure 3:
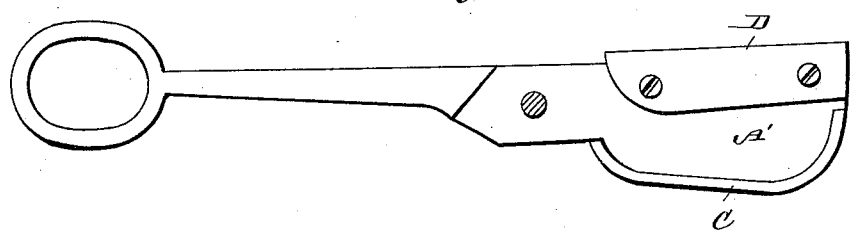
Figure 4:
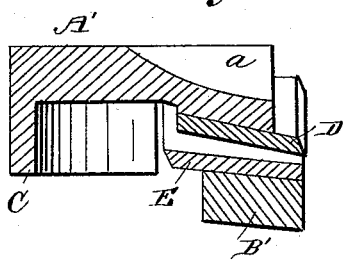

Figure 1 is a perspective view of my improved lamp-wick trimmer, the same being shown inverted. Fig. 2 is a longitudinal elevation of the lamp-wick trimmer. Fig. 3 is a longitudinal elevation of the under side of the lever provided with the pan. Fig. 4 is a cross-sectional elevation of my lamp-wick trimmer on the line $x\ x$, Fig. 2.

The trimmer is formed of two levers, A B, pivoted to each other, and provided with handle-loops in the same manner as scissors. The lever A is provided with a flat plate, A', at the end opposite the one provided with the handle-loop, which plate is provided on its under surface and at one edge with a segmental recess, $a$, forming a segmental inner edge on the plate A'. The lever B is provided at the end opposite the one provided with the handle with a plate, B', curved to fit on the curved part of the plate A'. Along the outer edge of the plate A' an upwardly-projecting flange, C, is formed, which forms a pan for receiving the parts cut from the wick. Steel cutter-blades D and E, curved to fit on the curved parts of the plates A' B', are secured on the said curved parts by screws or rivets at the inner edges in such a manner that the beveled edges of the cutting-blades project beyond the edges of the parts A' B'.

The wick-trimmer is placed on the dome of the burner in such a manner that the under surface of the recess $a$ fits on the dome, and then the projecting part of the wick can be cut off, the parts of the wick that are cut off being retained in the pan formed on the plate A'. The secured plate A' fits well on the domes of all burners, and the trimmer can be held horizontally or inclined, and need not always be held in exactly the same position. No gages or guides are provided on the trimmer, and the trimmer is very simple in construction. The blades D E can easily be removed in case they are to be sharpened, &c.

I am aware that wick-trimmers having curved blades have been made heretofore, and that I do not claim, broadly; but,

Having thus described my invention, I claim as new and desire to secure by Letters Patent—

In a wick-trimmer, the combination of two levers, one having a flat plate formed on one end, the said plate being provided with a curved recess in its under side and at its inner edge, the said plate having a flange along its outer edge on the upper surface, the other lever having a plate formed on its end, the said plate fitting on the curved part of the other plate, and both plates having their inner edges formed to cut substantially as herein shown and described.

ROBERT HOFFMAN.

Witnesses:
 OSCAR F. GUNZ,
 C. SEDGWICK.